Feb. 29, 1972  J. I. DOUGHTY ET AL  3,645,956
LIQUID MERCAPTO-TERMINATED POLYMER SEALANT COMPOSITIONS
Filed Sept. 15, 1967
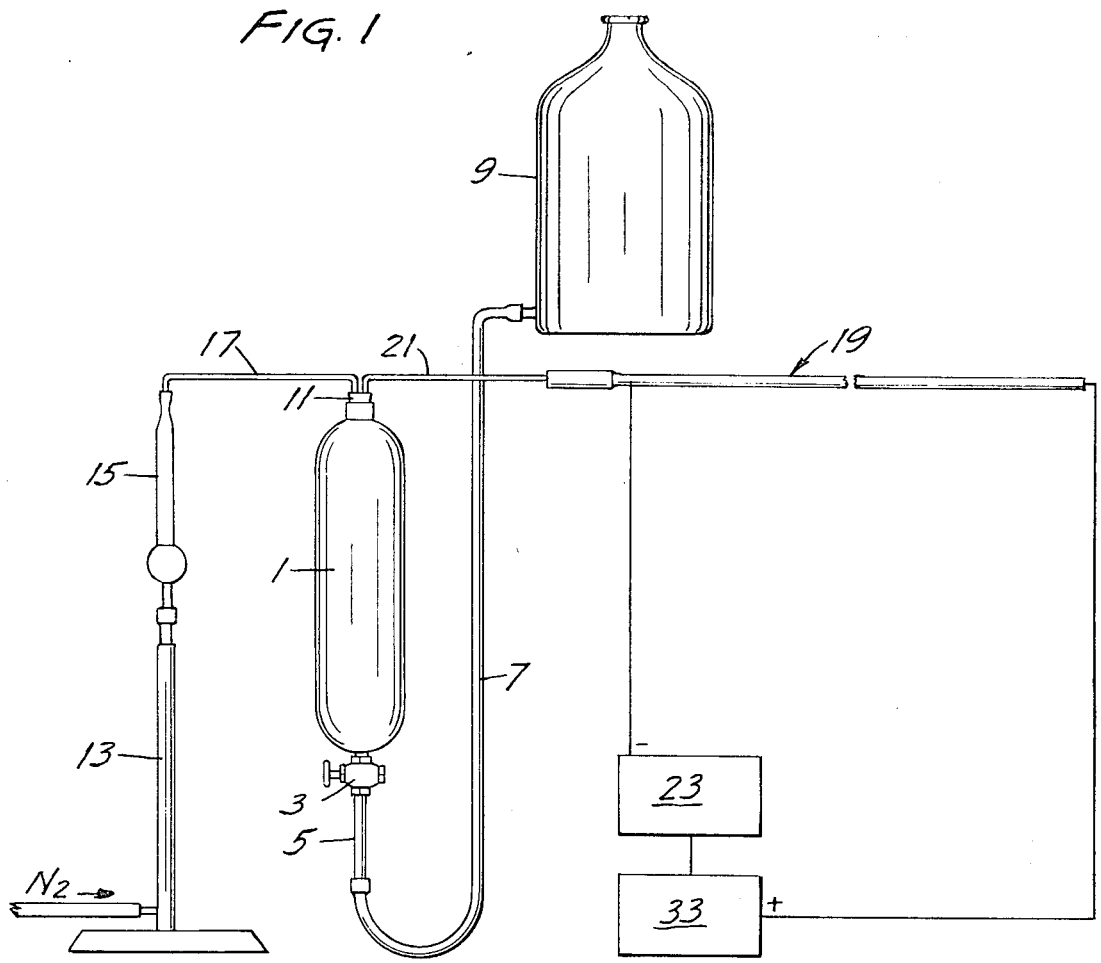
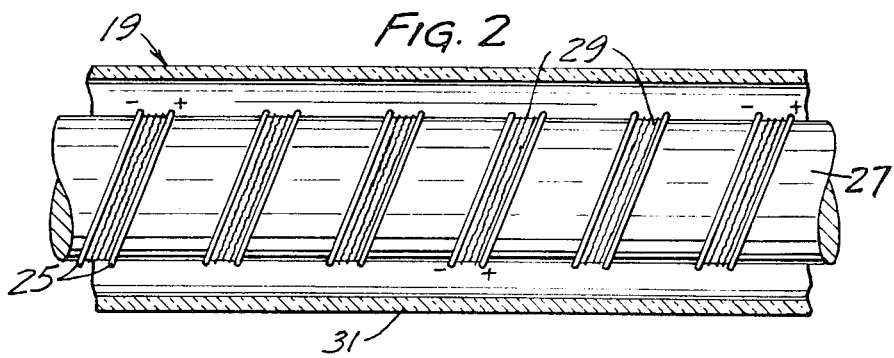
INVENTORS
JOHN I. DOUGHTY
PHILIP G. CHRISTMAN
BY Carpenter, Kinney & Coulter
ATTORNEYS

United States Patent Office 3,645,956
Patented Feb. 29, 1972

3,645,956
LIQUID MERCAPTO-TERMINATED POLYMER SEALANT COMPOSITIONS
John I. Doughty, White Bear Lake, and Philip G. Christman, St. Paul, Minn., assignors to Minnesota Mining and Manufacturing Company, St. Paul, Minn.
Filed Sept. 15, 1967, Ser. No. 667,983
Int. Cl. C08g 43/00, 51/44
U.S. Cl. 260—32.6 A                              9 Claims

ABSTRACT OF THE DISCLOSURE

A one-part, can stable, mercapto-terminated polymer-based sealant containing ingredients which enhance the transmission of moisture vapor through the sealant body to improve the cure rate. The ingredients include a latent oxidative curing agent, a latent hygroscopic accelerating agent, and a material which promotes the movement of water through the sealant matrix.

BACKGROUND OF THE INVENTION

Field of the invention

This invention relates generally to curable sealant and coating compositions and more specifically to one-part sealant and coating compositions stable under normal storage conditions and curable in the presence of moisture at relatively rapid rates even at low relative humidities.

Description of the prior art

One-part sealant compositions which incorporate both a room temperature curable base and a curing agent are generally preferred over their two-part counterparts, in which the base and curing agents are separately packaged. This preference is due to several factors, among which are ease of handling, reduction in mixing errors, and elimination of expensive mixing equipment by the user. The one-part moisture curing sealant compositions available today are based mainly on one of two types of polymers: (1) silicones; and (2) mercapto-terminated polymers, particularly mercapto-terminated polysulfides.

The silicones are relatively fast curing; the mercapto-terminated polymers cure somewhat more slowly. In the case of the silicones, water reacts with acetyl groups in the silicone polymer to split off acetic acid and provide cross-linking sites at the location of the departing acetyl groups. This reaction proceeds rapidly throughout the sealant mass, even at low humidities. Silicone based sealants have certain drawbacks, however, viz, high cost, need for special preparation of surfaces to be sealed, the tendency of the silicone oil plasticizers to migrate into porous surfaces, poor tear resistance, and the tendency to electrostatically attract dirt.

Mercapto-terminated polymer based sealants, on the other hand, are relatively inexpensive, easily applied, and present no migration or dirt attraction problems. Their one drawback is a slow rate of cure especially at low relative humidities, e.g. below 40% R.H. In some areas of the country this completely eliminates one-part polysulfide sealants from consideration. The disparity in cure rate between mercapto-terminated polymers and silicones appears to be due, at least in part, to the enhanced ability of water to penetrate the matrix of the latter.

The prime objective of this invention is to improve the cure rate of mercapto-terminated polymer based systems.

SUMMARY OF THE INVENTION

The foregoing object, as well as others which will become apparent hereinafter, is achieved by a one-part can-stable composition in the form of a spreadable, viscous, adherent, sag-resistant, thixotropic fluid which comprises broadly a mercapto-terminated liquid polymer, a latent curing agent, a latent, hygroscopic accelerating agent, and a moisture availability agent having a moisture vapor transmission rate (MVT) on the order of 200 or more grams per square meter per 24 hours at one centimeter thickness (g./m.²/24 hours). The first three components of this composition have been previously combined in sealant compositions (see U.S. Pat. No. 3,225,017); the fourth component converts the known three-component compositions into the first relatively fast room temperature curing polysulfide sealant, even at low relative humidities.

DESCRIPTION OF THE EMBODIMENTS

The mercapto-terminated liquid polymers are those which undergo further polymerization via the mercapto-groups according to the following reaction:

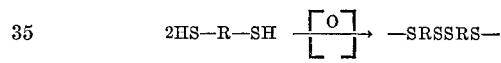

Suitable liquid polymers include the mercapto-terminated poly(oxyalkylene)polysulfides (sometimes merely referred to as polyalkylene polysulfides) such as are described in Patrick et al., U.S. Pat. No. 2,466,963 and patents cited therein. These liquid mercapto-terminated polysulfides are prepared by splitting a polysulfide having the recurring unit —RSSR— with sodium hydrosulfide, for example, and then converting the resultant sodium salt of the cleaved polymeric units with hydrogen sulfide to form the terminal mercapto groups. The high molecular weight polysulfides which are subjected to the cleavage reaction are formed from the reaction of sodium polysulfide with organic dihalides in the manner set forth in U.S. Pat. No. 2,466,963, as well as in an article by E. M. Fettes and J. S. Jorczak, Indusrial and Engineering Chemistry, 2217 (November 1950). The liquid (at 25° C.) mercapto-terminated polyalkylene polysulfides have molecular weights within the range of about 500 to 12,000. Exemplary of these polymers are the "LP" and "ZL" polymers such as LP–2, LP–3, ZL541A, and ZL537A available from the Thiokol Chemical Corp.

Other polymers suitable in the practice of this invention are thiol-therminated poly(oxyalkylene glycols) of the type disclosed in LeFave et al., U.S. Pat. No. 3,258,495, having the recurring unit $$R(OCH_2-CH-CH_2SH)_n$$
$$\phantom{R(OCH_2-C}|\phantom{H-CH_2SH)}$$
$$\phantom{R(OCH_2-C}OH$$

Also suitable are the mercapto-terminated polyesters which can be made by esterifying the hydroxyl group of a mercapto alcohol, such as beta-mercaptoethanol, with the carboxyl groups of a polycarboxylic acid, such as a polymerized fatty acid or an acidic polyester of a dicarboxylic acid and a glycol. These polyesters contain only two mercaptan groups. Polyester poly-mercaptans having an average of slightly more than two mercaptan groups may be similarly prepared by incorporating small proportions of tribasic acids or trihydroxy alcohols. Mixtures of the polyester polymercaptans with the polysulfide polymercaptans above described are also useful in the composition of this invention.

The function of the curing agent in the composition of this invention is to aid or bring about the intermolecular union of the terminal mercapto groups. Suitable oxidizing agents include the peroxides of alkaline earth and alkali metals such as zinc, calcium, strontium, lithium, barium, sodium, and potassium. Zinc oxide and zinc chromate provide observable but less effective curing. Seegman et al., U.S. Pat. No. 3,225,017, incorporated herein by reference, discloses these and other suitable curing agents for the composition of this invention.

The ability of a specific oxidizing agent to form an adequately stable mixture with the liquid polymer may be determined by a simple test. To the polymer there is first added one percent by weight of isosebacic acid. The required amount of oxidizer is then added and mixed in well. The viscosity of the mixture is noted. The mixture is then placed in a sealed container and held at 120° F. for several days, when it is again examined. With the preferred oxidizers, the mixture will exhibit no more than a slight thickening after seven days, and in most cases will remain at essentially its initial fluidity for at least three months. Oxidizers which cause but slight thickening in three days at 120° F. are useful in many cases, although not preferred where prolonged stability is required. On the other hand, compounds such as lead peroxide are found to cause severe thickening within a few minutes after being added to the polymer, and to cause curing to the rubbery state within a few hours. The rubbery state may be defined as the condition in which the polymer retracts essentially completely when momentarily stretched or compressed.

The third component of the composition of this invention is a latent, hygroscopic accelerating agent. Such alkaline materials as the alkali metal and alkaline earth metal oxides, peroxides and hydroxides display such characteristics and may be employed in the composition of this invention. Exemplary of such materials are barium, calcium, strontium, lithium, sodium, and potassium oxides, peroxides, and hydroxides, the barium compounds being preferred.

Certain of the above-described materials can perform the dual role of curing agent and accelerating agent, viz., the alkali metal and alkaline earth metal peroxides.

The importance of water in curing mercapto-terminated polymers is well known; the reason for it may be explained by reference to the postulated cure mechanism utilizing barium hydroxide and zinc peroxide for illustrative purposes.

(1) $Ba(OH)_2 + HS—R—SH$ (dry) → N.R.
(2) $Ba(OH)_2 + H_2O \rightarrow Ba^{++} + 2OH^- + H_2O$
(3) $2HSRSH + Ba^{++} + 2OH^- \rightarrow HSRSBaSRSH + 2H_2O$
(4) $ZnO_2 + HSRSBaSRSH \rightarrow BaO + HSRSSRSH + ZnO$
(5) $BaO + H_2O \rightarrow Ba(OH)_2$ Thus, the presence of water is necessary to the formation of ionic barium (step 2) which in turn reacts with the mercapto terminated polymer (step 3) to initiate the curing process.

It has been discovered that a moisture availability agent having an MVT rate (as defined hereinafter) of at least about 200 grams/meter²/24 hours aids in the distribution of externally acquired moisture throughout the sealant body. Curing of the mercapto-terminated polymer, which is dependent upon moisture, is thus facilitated at widely located sites, resulting in significant enhancement of the cure rate.

Exemplary of the moisture availability agents are the N,N-disubstituted amides of the formula $R^aCONR^bR^c$ where $R^a$, $R^b$, and $R^c$ may be aromatic, alicyclic, or aliphatic organic radicals. Preferably, $R^a$ is aromatic, although an aliphatic radical is also acceptable, e.g., pentyl, hexyl, heptyl, octyl, nonyl, etc. $R^b$ and $R^c$ are preferably aliphatic radicals of less than 5 carbon atoms; e.g., methyl, ethy, butyl, t-butyl. Typical compounds of the above types are N,N - diethyl-m-toluamide ("Detamide"), N,N-dimethyl caproamide ("Hallcomid M–6"), N,N-dimethyl lauramide ("Hallcomid M–12"), N,N-dimethyl myristamide ("Hallcomid M–14"), N,N-dimethyl stearamide ("Hallcomid M–18"), N,N-dimethyl oleamide ("Hallcomid H–18–OL"), as well as mixtures thereof ("Hall comid" is designation for disubstituted amides available from the C. P. Hall Co. and "Detamide" is a trade name for a disubstituted amide available from the Cowles Chemical Co.). In addition to the disubstituted amides, other suitable moisture availability agents include the diesters of phosphonic acids of the formula $$(R^dO)(R^eO)\overset{O}{\underset{\|}{P}}R^f$$

where $R^d$, $R^e$, and $R^f$ are aliphatic, alicyclic, or aromatic organic radicals. The phosphonic acids from which said diesters are derived have the formula $$R^f\overset{O}{\underset{\|}{P}}(OH)_2$$

Preferably, the phosphonates are the dialkyl alkyl phosphonates such as dibutylbutyl phosphonate, diamylamyl phosphonate, dimethylmethyl phosphonate, dimethylbenzyl phosphonate, and bis(2-ethylhexyl) 2-ethylhexyl phosphonate.

Preferably, the moisture availability agents are liquids physically compatible with the mercapto-terminated polymers both in the uncured state and in the cured polysulfide form. Compatibility in this sense means that the moisture availability agent will remain in a substantially thoroughly dispersed state in both the cured and uncured polymer.

The relative quantities of mercapto-terminated liquid polymer, curing agent, latent, hygroscopic accelerating agent, and moisture availability agent may vary over broad ranges. The curing agent should, of course be present in an amount sufficient to completely cure the mercaptoterminated polymer. Preferably at least a stoichiometric quantity of curing agent is employed. The latent, hygroscopic accelerating agent should be adapted and sufficient to maintain the contents of the package in dry condition during shipment and storage. Generally, these requirements are met by a composition in which for each chemical equivalent weight of mercapto-terminated polymer, there are from about 1.0 to about 28.0 (preferably about 4.0 to about 7.0) chemical equivalent weights of the curing agent and from about 0.5 to 13.0 (preferably from about 2.0 to 4.0) chemical equivalent weights of the accelerating agent, and from about 0.3 to about 11.0 (preferably about 1.5 to about 2.0) gram formula weights of the moisture availability agent. The primary limitation on the maximum quantity of curing and latent accelerating agent as well as the moisture availability agent is the loss of spreadable consistency and can stability. The primary limitation on the minimum quantity of such components is an acceptable degree and rate of cure. Most preferred is a composition in which 4 chemical equivalent weights of curing agent and 3.0 chemical equivalent weights of the accelerating agent, and 2 gram formula weights of the moisture availability agent are combined with one equivalent weight of mercapto-terminated polymer.

MVT rates are obtained by the following procedure utilizing equipment illustrated in the attached drawings in which FIG. 1 is a schematic diagram of the test equipment and FIG. 2 is a horizontal sectional view, greatly enlarged, of moisture sensor 19. A straight sided 100 cc. graduated funnel 1 equipped with a stopcock 3 and a depending stem 5 is attached at the stem to a rubber tubing 7 leading to a water container 9 elevated with respect to funnel 1 as shown. The stopcock 3 is opened to permit water to flow through tubing 7 into the stem 5, and a small amount to flow through the stopcock opening into the funnel, care being taken that the line contains no air bubbles. The stopcock is then closed, the water which passed through the stopcock removed by suction or decantation, and residual water removed by purging with dry nitrogen. The test solution (7% by weight reagent grade toluene solution of the material to be tested) is then added at the top of the funnel, which is equipped with a 2-hole rubber stopper 11.

The volume of the test solution added is such that if it were contained in the straight portion of the funnel 1 it would occupy a depth of 1 centimeter. Prepurified nitrogen is routed through a flow meter 13 into a drying tube 15 containing phosphorous pentoxide, through glass tubing (7 mm. I.D.) 17 and into the graduated funnel 1. The flow rate is adjusted to give approximately 0.2 liter/minute. An electrolytic moisture sensor 19 is connected to funnel outlet tube (7 mm. I.D.) 21. The system is then purged with nitrogen until an absence of moisture is indicated on the recorder unit 23 connected to the moisture sensor 19. Purging generally takes from 4 to 6 hours. The stopcock 3 is then opened very slowly so that water enters the funnel at a rate which does not visibly disturb the toluene/water boundary in such as way that mechanical mixing takes place. The water level is raised until the upper level of the test solution is 2 centimeters below the rubber stopper 11. Nitrogen purging is continued until an equilibrium is achieved by a straight line reading on the recorder 23.

The electrolytic moisture sensor may be a commercial unit such as an electrolytic moisture cell made by Consolidated Electrodynamics or it may be made as follows:

A double spiral of platinum wire 25, gauge 28, is wound around a 2 foot length of 5 mm. glass rod 27. The pair of wires is insulated with a length of glass fibers 29 having a diameter of approximately .015 inch. Each wire is approximately 50 inches long. The spacing between the pair is approximately ¼ inch. The ends of the wires are held to the glass rod with small pieces of tape. The glass fiber 29 is saturated with phosphoric acid. The glass rod 27 is then inserted into a 7 mm. I.D. glass tube 31. One end of one platinum wire is connected to a DC power supply 33, and one end of the remaining wire is connected to a milliamp recorder 23 as shown in the diagram. The remaining end of each wire is left unconnected. The unit is made ready for use by passing dry nitrogen through the tube while a DC voltage is applied to the wires. The current causes electrolysis to take place with the formation of $P_2O_5$:

$$4H_3PO_4 \rightarrow 2P_2O_5 + 6H_2 + 3O_2$$

The hydrogen and oxygen are gradually swept out with the nitrogen and the phosphoric pentoxide is deposited in the glass fiber. The unit is now ready for use. As moisture is deposited on the surface of the $P_2O_5$ it is electrolyzed. The amount of current which passes is proportional to the amount of water present according to Faraday's laws of electrolysis. The derivation of the formula is as follows:

One Faraday of electricity will electrolyze one equivalent of water. Therefore the number of Faradays = the number of equivalents $$= \frac{\text{coulombs}}{96{,}500} = \frac{\text{amps} \times \text{seconds}}{96{,}500}$$

$$\text{equivalents} = \frac{\text{grams water}}{9}$$

$$\frac{\text{amps} \times \text{seconds}}{96{,}500} = \frac{\text{grams water}}{9}$$

$$\text{grams water} = \frac{9 \text{ amps} \times \text{seconds}}{96{,}500}$$

$$\frac{\text{grams water}}{\text{second}} = \frac{9 \text{ amps}}{96{,}500}$$

$$\frac{\text{grams water}}{24 \text{ hrs.}} = \frac{9 \text{ amps} \times 24 \times 3600}{96{,}500}$$

$$\frac{\text{grams water}}{24 \text{ hrs.}} = 8.06 \times \text{amps}$$

The above formula gives the MVT rate in grams/A/24 hrs. The area (A) in this case is equal to the cross sectional area of the funnel which is 6.85 cm.² The MVT rate in grams/m.²/24 hrs. is obtained as follows:

MVT rate in grams/m.²/24 hrs.

$$= \frac{8.06 \times \text{amps}}{6.85 \text{ cm.}^2} (100 \text{ cm.})^2$$

$$\text{MVT rate} = 11.8 \times \text{milliamps}$$

The following examples serve to further illustrate the invention.

EXAMPLE I

A master batch having the following composition is prepared in a five gallon Baker-Perkins mixer:

Master batch

| Name: | Wt. (grams) |
|---|---|
| (1) "Thiokol" ZL 541A [1] | 8,750 |
| (2) "Thiokol" ZL 537A [2] | 1,250 |
| (3) RR 10 [3] | 100 |
| (4) Ball mill pre-mix | 4,972 |
| (5) Filler | 5,500 |
| (6) Polyester resin [4] | 535 |
| | 21,107 |

Ball mill pre-mix

| Name: | Wt. (grams) |
|---|---|
| (7) Barium hydroxide (anhydrous) | 600 |
| (8) Barium oxide | 540 |
| (9) Calcium peroxide | 1200 |
| (10) HB 40 [5] | 1200 |
| (11) Toluene | 600 |
| (12) "Igepal" CO 210 [6] | 27 |
| (13) "Santowax" R [7] | 1800 |
| | 5967 |

Filler

| | |
|---|---|
| (14) "Purecal" U [8] | 4900 |
| (15) "Tipure" R-610 [9] | 2800 |

[1] A non-crosslinked mercapto-terminated polysulfide manufactured by the Thiokol Chemical Corp. having a molecular weight of about 4000 and a viscosity of between 350–450 poises at 25° C. as measured on a Brookfield viscometer.
[2] Same as (¹) except 4 mol percent cross-linking sites.
[3] Mixed isomers of dixylyl disulfides which function as chain stoppers, available from E. I. du Pont & Co.
[4] A carboxyl terminated polyester having a hydroxyl number of 3 or less, an acid number of about 42, and a viscosity of about 800 poises at 25° C.
[5] Hydrogenated terphenyl plasticizer available from Monsanto Co.
[6] A nonyl phenol-ethylene oxide adduct, available from General Aniline & Film Corp., which functions as a non-ionic oil-soluble surfactant.
[7] Solid plasticizer composed of a mixture of o, m and p-terphenyl made by Monsanto Co.
[8] Ultrafine precipitated calcium carbonate available from Wyandotte Chemical Corp.
[9] Titanium dioxide (rutile) available from E. I. du Pont & Co.

Make procedure

*Ball mill pre-mix preparation.*—A 1 gal. ball mill jar containing a sufficient number of balls is charged with the above ball mill ingredients except the Santowax R and rolled overnight at about 24 r.p.m. The Santowax R is then added and rolling continued for 5 days at which time adequate dispersion is achieved.

*Filler preparation.*—A 5 gal. blender is charged with the two filler ingredients which are blended overnight using steam at 15 p.s.i.g. for drying. The contents are then transferred to a pail equipped with a drying tube for storage prior to use.

*Master batch preparation.*—To a 5 gal., covered Baker-Perkins mixer equipped with a nitrogen sweep is added, with mixing and under a nitrogen atmosphere, the ingredients listed under the heading "Master batch" in the order stated. Addition and mixing is complete after six hours.

Individual batches containing 844 g. of the master batch and one of the ingredients listed below are prepared in a quart size mixer in a dry box.

| Sample | Ingredient | Amount (g.) |
| --- | --- | --- |
| 1 | "Hallcomid" M12[j] | 70.5 |
| 2 | "Detamide" 95[k] | 70.5 |
| 3 | Dibutylbutyl phosphonate | 70.5 |
| Control | (Nothing added) | |

[j] N,N-dimethyl lauramide available from the C. P. Hall Co.

[k] 
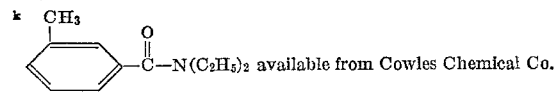
available from Cowles Chemical Co.

Can lids approximately 2 inches in diameter and ¼ inch deep are filled with each of the above samples and exposed under the conditions stated in Table I.

TABLE I

| Sample | Cure through—days reach ¼" depth | | MVT rate[1] |
| --- | --- | --- | --- |
| | 75° F., 50% RH | 80° F., 80% RH | |
| 1 | 27 | 14 | 335 |
| 2 | 28 | 13 | 347 |
| 3 | 10 | 6 | 420 |
| Control | (n) | 29 | [m] 99 |

[1] This refers to MVT rate of the moisture availability agent measured as previously described.

[m] This is the MVT rate of toluene with no moisture availabilit yagent added.

[n] The control did not cure through at 60 days.

Sealants embodying the composition of this invention also contain various additives which serve to tailor the sealant to the particular end use as can be seen from the compositions described in the foregoing examples. The addition of and increase in the amount of fillers, pigments and reinforcing agents such as calcium carbonate, iron oxide, aluminum powder, silicon dioxide, clays, zinc sulfide, carbon black, rayon flock, titanium dioxide, etc., will in general increase the Shore hardness, toughness and tensile strength and decrease elongation of the product.

Certain resinous additives may be employed to reduce sag and promote adhesion of the sealant to the substrate. The carboxyl-terminated polyester employed in Example I having a viscosity of about 800 poises at 25° C. exemplifies a suitable sag inhibitor. Plasticizers, which increase the fluidity of the composition, improve the dispersion of the solids, and soften the cured composition, represent a further class of additives. Hydrogenated terphenyl such as HB-40, available from Monsanto Chemical Co., is a suitable plasticizer as are the chlorinated diphenyl compositions such as the "Aroclors" available from the same company.

The compositions of this invention exhibit satisfactory shelf stability under normal storage conditions. Packaged in fluid form, the compositions can be extruded by means of a calking gun in thin ribbon form with sufficient body to adhere to vertical surfaces without appreciable sagging.

While the compositions of this invention cure at a faster rate than was hitherto obtainable with one-part mercapto-terminated polymer based sealants, the work life of the composition is still completely satisfactory. Particular applications for the compositions of this invention include sealants and coatings for buildings, automobiles, boats, and airplanes.

What is claimed is:

1. A spreadable viscous fluid composition stable in a substantially moisture free, hermetically sealed container and capable of conversion to a rubbery state in the presence of surroundings containing essentially only moisture, said composition comprising a liquid mercapto-terminated polymer having thoroughly dispersed therein:
    (a) at least one latent oxidative curing agent in an amount sufficient to cure said polymer, said curing agent in admixture with said polymer causing not more than slight thickening thereof in three days at 120° F.;
    (b) at least one latent hygroscopic accelerating agent selected from the group consisting of the alkali metal and alkaline earth metal oxides, peroxides, and hydroxides, said accelerating agent being adapted and sufficient to maintain said composition in dry condition during shipment and storage and to attract and absorb moisture from its surrounding after deposition in place to hasten the curing of said polymer; and
    (c) a moisture availability agent having a moisture vapor transmission rate of at least about 200 grams/meter$^2$/24 hours, said moisture availability agent being at least one member of the class consisting of an N,N-dialkyl substituted amide.

2. A spreadable viscous fluid composition stable in a substantially moisture free, hermetically sealed container and capable of conversion to a rubbery state in the presence of surroundings containing essentially only moisture, said composition comprising a liquid mercapto-terminated polymer having thoroughly dispersed therein:
    (a) at least one latent oxidative curing agent in an amount sufficient to cure said polymer, said curing agent in admixture with said polymer causing not more than slight thickening thereof in three days at 120° F.;
    (b) at least one latent hygroscopic accelerating agent selected from the group consisting of the alkali metal and alkaline earth metal oxides, peroxides, and hydroxides, said accelerating agent being adapted and sufficient to maintain said composition in dry condition during shipment and storage and to attract and absorb moisture from its surrounding after deposition in place to hasten the curing of said polymer; and
    (c) a moisture availability agent being at least one member selected from the class consisting of N,N-dimethyl lauramide, and N,N-diethyl toluamide.

3. The composition of claim 2 wherein said moisture availability agent is N,N-dimethyl lauramide.

4. The composition of claim 2 wherein said moisture availability agent is N,N-diethyl-m-toluamide.

5. A spreadable viscous fluid composition stable in a substantially moisture free hermetically sealed container and capable of conversion to a rubbery state in the presence of surroundings containing essentially only moisture, said composition comprising a liquid mercapto-terminated poly(oxyalkylene) polysulfide having thoroughly dispersed therein:
    (a) calcium peroxide in an amount sufficient to cure said polymer;
    (b) a mixture of barium oxide and barium hydroxide adapted and sufficient to maintain said composition in dry condition during shipment and storage and to attract and absorb moisture from its surroundings after desposition in place to hasten the curing of said polymer; and (c) at least one moisture availability agent having an MVT rate of at least about 200 grams/meter$^2$/24 hours, and selected from the class consisting of an N,N-dialkyl amide.

6. The composition of claim 5 wherein said moisture availability agent is an aromatic N,N-dialkyl substituted amide.

7. The composition of claim 5 wherein said moisture availability agent is N,N-dimethyl lauramide.

8. The composition of claim 5 wherein said moisture availability agent is N,N-diethyl-m-toluamide.

9. The composition of claim 2 wherein said latent oxidative curing agent is at least one member selected from the class consisting of alkaline earth peroxides and alkali metal peroxides.

References Cited
UNITED STATES PATENTS

| | | | |
|---|---|---|---|
| 2,964,503 | 12/1960 | Carpenter et al. | 260—79.1 |
| 3,225,017 | 12/1965 | Seegman et al. | 260—79.1 |

ALLAN LIEBERMAN, Primary Examiner

U.S. Cl. X.R.

260—30.6, 32.6 R, 79, 79.1

UNITED STATES PATENT OFFICE
CERTIFICATE OF CORRECTION

Patent No. 3,645,956          Dated February 29, 1972

Inventor(s) John I. Doughty and Philip G. Christman

It is certified that error appears in the above-identified patent and that said Letters Patent are hereby corrected as shown below:

Col. 3, line 23, after "potassium" and before "." insert -- ; the alkali metal dichromates such as sodium and potassium dichromate; ammonium dichromate, and the alkali metal chlorates, such as potassium chlorate -- .

Signed and sealed this 11th day of July 1972.

(SEAL)
Attest:

EDWARD M. FLETCHER, JR.          ROBERT GOTTSCHALK
Attesting Officer                Commissioner of Patents